Patented Oct. 20, 1953

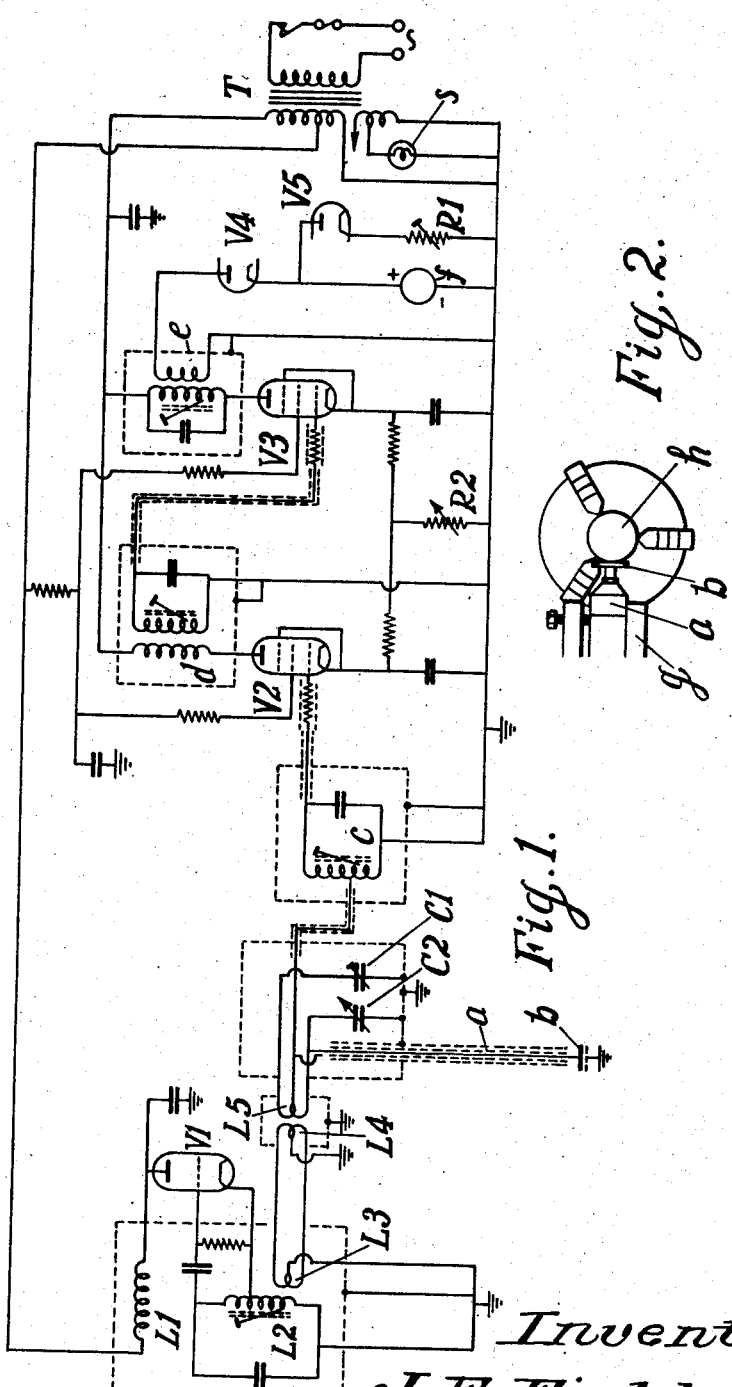

2,656,507

UNITED STATES PATENT OFFICE 2,656,507

PROXIMITY METER

John Ernest Fielden, Wythenshawe, Manchester, England, assignor to Fielden (Electronics) Limited, Manchester, England, a British company Application May 8, 1950, Serial No. 160,639
In Great Britain May 11, 1949

4 Claims. (Cl. 324—61)

This invention has for its object to provide a convenient and accurate device for indicating the distance between an object and other neighboring objects for gauging the dimensions of articles, and so forth.

The arrangement according to the invention comprises an oscillator supplying high frequency electrical oscillations through a capacity-sensitive circuit to an amplifier coupled with a suitable measuring instrument, an electrode being connected by means of a screened coaxial cable to the capacity-sensitive circuit so that variations in its distance from surrounding objects, causing variations in capacity, modify the voltages applied to the amplifier and the readings of the measuring instrument.

According to a further feature of the invention, the apparatus has a capacity-sensitive circuit in the form of a bridge comprising inductances and capacities, one of said capacities including the stray capacity between the electrode and its surroundings.

Preferably the bridge comprises two inductances forming the secondary winding of a transformer by which a high frequency alternating current is applied to the bridge, the junction between said inductances being connected to an amplifier, and the junction between the bridge capacities being earthed.

The uses of this instrument can be divided into two main fields:

1. Where the user is dealing with conducting materials, in which case the instrument provides an invaluable method of dimensional comparison and measurement unsurpassed by any other means, e. g. the measurement of strains in ships, steel structures, machine tools, aircraft, etc. the gauging of mass produced precision parts with greater accuracy than any other method and without wear and tear of the equipment; the monitoring of sheet metal, foil or wire sizes; the precision measurement of liquid levels (e. g. a small metal band round the stem of a mercury thermometer enables a movement of $\frac{1}{16}$" of the mercury column to deflect the instrument from zero to full scale).

2. Where the user is dealing with non-conducting materials (dielectrics), in which case the instrument may be used for dimensional control where the composition is constant, or composition control where the dimensions are constant, e. g. monitoring the thickness of plastic film, determining the moisture content of powders, comparing the dielectric properties of non-conducting liquids.

In the accompanying drawing, Figure 1 is a circuit diagram of an arrangement in accordance with the invention.

Figure 2 shows diagrammatically one application of the arrangement according to the invention.

The valve V1 is a radio-frequency oscillator, having an inductance L1 in its anode circuit coupled with a tuned inductance L2 in its grid circuit. The inductance L2 serves also as the primary of a transformer the secondary L3 of which has its centre earthed and its ends connected to the ends of the primary L4 of a further transformer, the centre of which is likewise earthed. The secondary L5 of this second transformer is thus energised from the oscillator through a grounded link coupling and is isolated from any signal from the oscillator resulting from stray capacitance. The transformer secondary L5 has one end connected to a variable condenser C1, the other side of which is earthed, and the other end connected to a variable condenser C2, the other side of which is earthed, and to the central conductor of a coaxial cable $a$, which leads to a metal electrode $b$, such as a small metal disc. The centre of the secondary L5 is connected to an intermediate conductor of the cable $a$, and an outer conducting screen of the cable is earthed. The centre of the secondary is further connected to the input of an amplifier feeding a valve volt meter.

The amplifier comprises a tuned input circuit $c$ and valves V2, V3 with tuned output transformers $d$, $e$, the latter of which feeds a meter $f$ by way of a diode V4. A further diode V5, with a variable resistance R1 in its cathode lead, is used to provide an adjustable backing off voltage to cancel out the small standing current in the diode V4 due to space charge current, at nil anode current condition of the amplifier. A variable resistance R2 provides a sensitivity control. A power transformer T provides operating current, the low tension secondary winding feeding a signal lamp $s$, as well as the valve heaters.

The transformer secondary L3 is preferably wound from two strands of wire twisted together, one end of one strand being connected to that end of the other strand which is at the other end of the winding, and the junction forming the centre tap, whereby voltages which are equal in amplitude and opposite in phase are developed in the winding sections. The free ends of the strands are prolonged to form leads for connection to the primary L4. The secondary L5 may be constructed in the same way.

This constitutes in effect a bridge comprising two inductances, viz. the sections of the transformer secondary L5 and two capacitances, viz. the variable condenser C1 and the stray capacity between the electrode b and its surroundings, with the condenser C2 in parallel therewith, the amplifier being between the junction of the inductances and the junction of the capacities. The electrode b may then be mounted close to say a metal object and with suitable adjustment of the equipment a substantial deflection of the valve voltmeter may be obtained if the distance of the electrode from the object varies by a very small amount such as one millionth inch, owing to the bridge becoming unbalanced. The condenser C2 is employed for adjusting the equipment to bring the meter pointer to zero after the electrode has been suitably positioned.

One application of the invention is illustrated by way of example in Figure 2.

The electrode b is in the form of a metal disc, and the end of the coaxial cable a is clamped in the tool post g of a lathe. A piece of work h previously chucked and turned (apparently true) is left in the chuck and the cross slide adjusted until the space between the electrode plate and the work is of the order of about .005". The instrument is then set to zero by the zero control C2, the slide rest advanced .001" and the sensitivity of the instrument adjusted until the meter f shows full scale deflection. If the meter scale has 100 divisions, one division of the scale now represents .00001". The zero control C2 can now be adjusted if required to place the meter pointer mid-scale for dimension comparisons. The work can be examined for roundness, and in case of discrepancy the whole machine checked to locate the cause of the error. The headstock bearing can be checked with great accuracy and the whole of the machine structure examined with precision. At maximum sensitivity it is possible to measure distortions in the lathe bed with no more than finger pressure applied to the casting.

What I claim is:

1. An electrical apparatus for indicating the distance between an object and a neighboring object, for gauging dimensions of articles, and so forth, comprising an oscillator supplying high frequency electrical oscillations, an amplifier, an electrical measuring instrument in the output circuit of the amplifier, a capacity-sensitive bridge circuit comprising inductances and capacities and coupling the oscillator with the amplifier, an electrode, the capacity of which depends on its distance from surrounding objects, and a double screen coaxial cable for connecting the electrode to the capacity-sensitive circuit, having an outer screen which is earthed, an inner screen connected to the junction between two inductive bridge arms, and a central conductor connecting the electrode to the junction between an inductive and a capacitative bridge arm, the other end of the capacitative arm being earthed, so that variations in its capacity modify the voltages applied to the amplifier, and the readings of the measuring instrument.

2. An electrical apparatus of the class described, comprising an oscillator for supplying high frequency electrical oscillations, a capacity sensitive bridge circuit, a grounded link coupling for energising said circuit from said oscillator, an electrode the capacity of which depends on its distance from surrounding objects, a coaxial cable having outer and inner screens connected to said circuit for reducing the effect of conductor capacity and a central conductor connecting said electrode to one branch of said bridge circuit whereby said electrode forms another branch of said bridge circuit, and means for detecting changes of conditions in said circuit, said means being connected as the detector branch of said bridge across two junctions thereof, said inner screen being connected to the high potential side of said detector branch and said outer screen being grounded.

3. Apparatus as claimed in claim 2 wherein said bridge circuit comprises inductances and capacities, said inner screen being connected to the junction between two inductive bridge arms, said central conductor connecting said electrode to the junction between an inductive and a capacitative bridge arm, the other end of said capacitative arm being grounded.

4. An electrical apparatus of the class described comprising an oscillator for supplying high frequency electrical oscillations, a capacity sensitive circuit, a grounded link coupling for energising said circuit from said oscillator, an electrode the capacity of which depends on its distance from surrounding objects, said electrode being connected to said circuit for varying conditions thereof, and means for detecting changes of conditions in said circuit, said grounded link coupling comprising a first inductance inductively coupled with said oscillator, a second inductance connected across said first inductance and inductively coupled with said circuit, and means for grounding the centre of such inductances respectively.

JOHN ERNEST FIELDEN.

References Cited in the file of this patent

UNITED STATES PATENTS

| Number | Name | Date |
|---|---|---|
| 2,076,944 | Howe | Apr. 13, 1937 |
| 2,241,190 | Fenning | May 6, 1941 |
| 2,285,152 | Firestone | June 2, 1942 |
| 2,485,579 | Elliott | Oct. 25, 1949 |
| 2,519,089 | Whitaker | Aug. 15, 1950 |